United States Patent [19]
Chen et al.

[11] Patent Number: 5,285,339
[45] Date of Patent: Feb. 8, 1994

[54] MAGNETORESISTIVE READ TRANSDUCER HAVING IMPROVED BIAS PROFILE

[75] Inventors: Mao-Min Chen; Kochan Ju; Mohamad T. Krounbi, all of San Jose; Ching H. Tsang, Sunnyvale; Po-Kang Wang, San Jose, all of Calif.

[73] Assignee: International Business Machines Corporation, Armonk, N.Y.

[21] Appl. No.: 843,702

[22] Filed: Feb. 28, 1992

[51] Int. Cl.$^5$ .............................. G11B 5/127
[52] U.S. Cl. ........................................ 360/113
[58] Field of Search .......................... 360/113

[56] References Cited

U.S. PATENT DOCUMENTS

| | | | |
|---|---|---|---|
| 4,242,710 | 12/1980 | Hempstead et al. | 360/113 |
| 4,626,947 | 12/1986 | Narishige et al. | 360/126 |
| 4,663,607 | 5/1987 | Kitada et al. | 338/32 H |
| 4,750,072 | 6/1988 | Takagi | 360/126 |
| 5,018,037 | 5/1991 | Krounbi | 360/113 |

Primary Examiner—A. J. Heinz
Attorney, Agent, or Firm—Leslie G. Murray

[57] ABSTRACT

An MR read transducer having passive end regions separated by a central active region comprises an MR layer made from a material having a low uniaxial magnetic anisotropy. A soft magnetic bias layer is adjacent to but spaced from the MR layer in the central region only, and the soft magnetic bias layer is made from a material having a high uniaxial magnetic anisotropy. A longitudinal bias is produced directly in each of the end regions only, and the means for producing the longitudinal bias comprise a layer made from a material having a high uniaxial magnetic anisotropy. Control of the uniaxial anisotropy can be achieved by choosing materials of appropriate magnetostriction or intrinsic uniaxial anisotropy.

19 Claims, 2 Drawing Sheets

MAGNETORESISTIVE READ TRANSDUCER HAVING IMPROVED BIAS PROFILE

BACKGROUND OF THE INVENTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

The prior art also teaches that in order for an MR element to operate optimally, two bias fields should be provided. In order to bias the material so that its response to a flux field is linear, a transverse bias field is generally provided. This bias field is normal to the plane of the magnetic media and parallel to the surface of the planar MR element.

The other bias field which is usually employed with MR elements is referred to in the art as the longitudinal bias field which extends parallel to the surface of the magnetic media and parallel to the lengthwise direction of the MR element. The function of the longitudinal bias field is to suppress Barkhausen noise which originates from multi-domain activities in the MR element.

Magnetostriction has been used to stabilize the read back signal of thin film inductive heads. U.S. Pat. No. 4,242,710 teaches that the composition of the pole tip and yoke material are tailored and controlled to have a proper magnetostriction coefficient, and that negative magnetostriction is best for pole pieces for thin film inductive heads.

U.S. Pat. No. 4,626,947 teaches that the characteristics of the thin film magnetic head depend on the magnitude of the magnetostriction rather than the sign and for this reason the magnetostriction coefficient should be limited to no more than $6 \times 10^{-7}$. U.S. Pat. No. 4,750,072 discloses a thin film magnetic head in which the central part of the magnetic core is formed of a material having a positive magnetostriction and some side parts of the magnetic core have a negative magnetostriction to prevent the formation of edge domains.

U.S. Pat. No. 4,663,607 discusses the magnetostriction requirements of an MR element, and states that the MR element should have zero magnetostriction so that variations in composition of the MR element prevent magnetic characteristics from changing. Since it is difficult to produce a zero magnetostriction in a single layer due to manufacturing tolerances, a structure is utilized which has multiple layers with the layers alternating with a positive magnetostriction of a particlular magnitude and a negative magnetostriction of the same magnitude. The manufacturing tolerance for the multiple layers tend to cancel so that a composite film having a magnetostriction very close to zero results.

Common practice in the art has been to have a soft magnetic bias layer with a magnetostriction close to zero. However, the prior art does not discuss the effects of the use of high magnetostriction materials on the bias profile of MR sensors.

SUMMARY OF THE INVENTION

It is therefore the principal object of this invention to provide a magnetoresistive (MR) read transducer in which the uniaxial magnetic anisotropies, Hk, are independently tailored in various parts of the MR layer and bias layers to enhance the preferred magnetic bias configuration thereby improving the transducer stability and its bias profile.

In accordance with the present invention, an MR read transducer having passive end regions separated by a central active region comprises an MR layer made from a material having a low magnetic anisotropy corresponding to a high permeability. A soft magnetic bias layer is adjacent to but spaced from the MR layer in the central region only, and the soft magnetic bias layer is made from a material having a high magnetic anisotropy along the transverse signal direction. A longitudinal bias is produced directly in each of the end regions only, and the means for producing the longitudinal bias comprise a layer made from a material having a high magnetic anisotropy along the longitudinal direction.

The independent selection of the directions and magnitudes of the uniaxial magnetic anisotropy for the various portions of the MR read transducer enhances the magnetic bias configuration of the transducer and improves its stability as well as its bias profile.

In accordance with one embodiment of the present invention, an MR read transducer having passive end regions separated by a central active region comprises an MR layer made from a material having a low magnetostriction coefficient. A soft magnetic bias layer is adjacent to but spaced from the MR layer in the central region only, and, assuming a tensile stress, the soft magnetic bias layer is made from a material having a high positive magnetostriction coefficient. A longitudinal bias is produced directly in each of the end regions only, and the means for producing the longitudinal bias comprise a layer made from a material having a high negative magnetostriction coefficient.

In another embodiment of the present invention, the soft magnetic bias layer is made from a material having a high magnetic anisotropy in a direction substantially normal to the sensing edge of the MR sensor.

For a fuller understanding of the nature and advantages of the present invention, reference should be made to the following detailed description taken in conjunction with the accompanying drawings.

DESCRIPTION OF THE PREFERRED EMBODIMENT

According to one embodiment of the present invention, magnetostrictive materials of different sign and magnitude are utilized for the various portions of the magnetoresistive (MR) sensor so that the preferred magnetic bias configuration can be enhanced thereby improving the sensor stability and its bias profile. With a specific embodiment of an MR sensor which is under a tensile stress perpendicular to the air bearing surface, a material of low magnetostriction is used for the MR layer, and a material of high positive magnetostriction is used for the soft film bias layer in the active region to improve the MR bias profile as well as to enhance the transverse soft film stability. In addition, a high negative magnetostriction material is used in the MR passive regions to enhance the longitudinal bias stability.

Alternatively, the bias profile in the above-described MR sensor can also be improved by making the soft film magnetic layer of a material having a high intrinsic magnetic anisotropy in a direction substantially normal to the sensing edge of the MR sensor.

Figure 1:
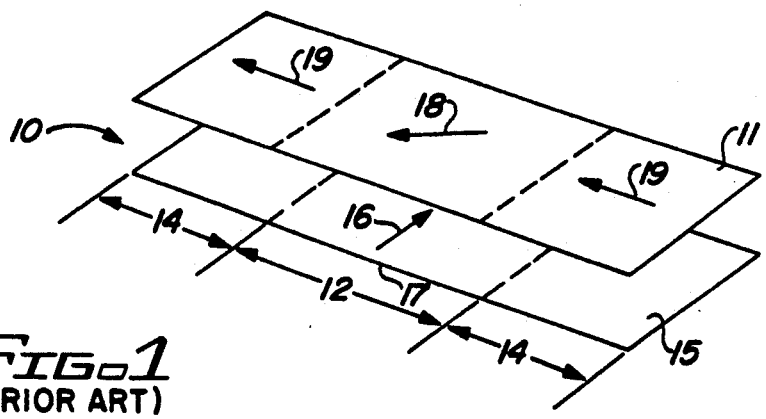
FIG. 1 is a diagram showing the sensor configuration of a prior art magnetoresistive read transducer.

Prior to describing the present invention in detail, a prior art MR sensor will be described briefly in conjunction with FIG. 1. The magnetic read head 10 utilizes an MR layer 11, and the MR layer 11 can be divided into two regions, the central active region 12, where actual sensing of data is accomplished, and end regions 14. The design recognizes that the two regions should be biased in different manners with longitudinal bias directly in the end regions 14 only and transverse bias in the central active region 12 only. The transverse bias is produced by soft magnetic film layer 15 which is separated from the MR layer 11 by a distance sufficient to prevent, within the active central region, a magnetic exchange bias between the MR layer 11 and the soft magnetic bias layer 15. The magnetization in the soft magnetic bias layer, as shown by arrow 16, is substantially normal to the air bearing surface (ABS) which is defined by the sensing edge 17, and this magnetization produces magnetization at a chosen angle in the central region of the MR layer as shown by arrow 18. The longitudinal bias produces a magnetization in the end regions 14 of the MR layer as shown by arrows 19, and this magnetization is sufficient to maintain the end regions in a single domain state.

The operation of this sensor is based on the premise that, with the end regions 14 in a single domain state, the central region 12 is forced into a single domain state so long as the longitudinally unbiased central region is not too long in comparison to the height of the sensor. This sensor design has been demonstrated to provide much more stable operating characteristics, greater sensor sensitivity, and better suppression of Barkhausen noise than prior art designs having continuous exchange bias over the active and passive sensor segments.

In one embodiment of the present invention, magnetostrictive materials of different sign and magnitude are utilized for the various portions of the MR sensor so that the stress induced anisotropy enhances the desired state. In general, a tensile stress is produced as a result of the air bearing formation on the multilayer structure which includes the substrate, substrate undercoat, magnetic layers and an overcoat. With a specific embodiment of an MR sensor which is under a tensile stress perpendicular to the air bearing surface (ABS), a material of high positive magnetostriction is used for the soft film bias layer in the active region to improve the MR bias profile as well as to enhance the transverse soft film bias stability. In addition, a high negative magnetostriction material is used in the MR passive region to enhance the longitudinal bias stability.

Alternatively, a material having a high intrinsic magnetic anisotropy in a direction substantially normal to the ABS can be used for the soft film bias layer.

Figure 2:
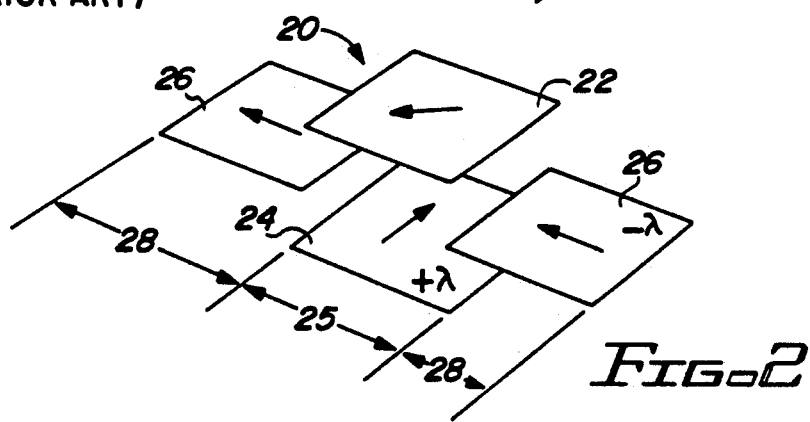
FIG. 2 is a diagram showing the sensor configuration of a magnetoresistive read transducer according to the present invention.

A conceptual diagram for an MR sensor, according to the present invention, is shown in FIG. 2 in which the MR sensor 20 comprises an MR layer 22 and a soft magnetic bias layer 24, each of which extends over the central region 25 only. Longitudinal bias layers 26 extend over the end regions 28 only. In this design, the soft magnetic bias layer 24 is made of a material having a high positive magnetostriction, such as a magnetostriction coefficient of $5 \times 10^{-6}$ or greater, for example, and the MR layer 22 is made of a material having a low magnetostriction, such as a magnetostriction coefficient magnitude of $1 \times 10^{-6}$ or less. The longitudinal bias layers 26 are made of a material having a high negative magnetostriction.

The combination of a high positive magnetostriction soft magnetic bias layer 24 and tensile stress produces a stress induced anisotropy in the soft magnetic bias layer 24 that is perpendicular to the ABS and the sense current. In general, tensile stress is produced as a result of the air bearing formation of the multilayer structure which includes the substrate, substrate undercoat, the magnetic layers 22, 24, 26 and an overcoat. With proper initialization to orient the soft magnetic bias layer 24 magnetization to the correct polarity, the stress induced anisotropy aids in the saturation of the soft magnetic bias layer magnetization, therefore resulting in a more uniform bias profile for the sensor and a higher read back signal level. This choice of magnetization for the soft magnetic bias layer 24 also enhances the stability of the soft magnetic bias layer from external magnetic field disturbances.

The magnetostriction value of the MR layer 22 in this design in the active region must be kept low relative to the magnitude of the soft film layer 24 magnetostriction to avoid a hysteretic transverse response. The low magnetostriction of the MR layer 22 also ensures a high effective permeability which is needed for maintaining a high read back signal level.

In the passive end regions 28, the combination of negative magnetostriction and tensile stress produces an induced magnetic anisotropy parallel to the sensor. This induced anisotropy assists the exchange field and the shape anisotropy in retaining the MR magnetization in the desired longitudinally initialized state. In addition, the stress induced anisotropy results in an increase of domain wall energy which makes domain wall generation energetically unfavorable. For sufficiently narrow MR layers, the combination of shape anisotropy and stress induced anisotropy may be sufficient to keep the sensor in the initialized state without exchange bias.

Figure 3:
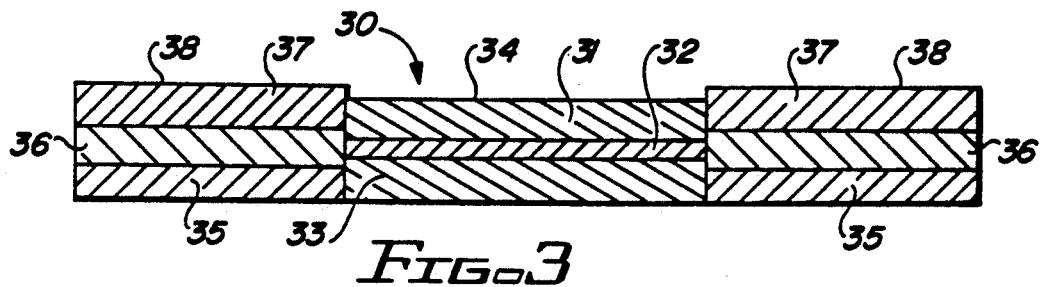
FIG. 3 is an end view of a specific embodiment of a magnetoresistive read transducer according to the present invention.

A specific embodiment of an MR sensor, according to the present invention, is shown in FIG. 3. The MR sensor 30 comprises an MR layer 31, a nonmagnetic spacer layer 32, and a soft magnetic bias layer 33, each of which extends over the central region 34 only. The MR sensor 30 also comprises means for producing a longitudinal bias and a conductive lead structure 37, each of which extends over the end region 38 only. The means for producing a longitudinal bias comprises a ferromagnetic layer 35 and a layer of antiferromagnetic material 36 in contact with ferromagnetic layer 35 to produce exchange bias of a level sufficient to maintain the end regions 38 in a single domain state.

In this embodiment the high positive magnetostriction for the soft magnetic bias layer 33 can be produced by the use of a NiFe layer which has a high Fe content. However, the preferred material for the soft magnetic bias layer 33 is a ternary alloy such as NiFeX in which X can be Rh, Ti, Cr, Ir or Nb. The third element is added for quenching the MR effect, diluting the saturation moment of the soft magnetic bias layer and for increasing its sheet resistance. The dilution of the saturation moment improves the thickness process tolerance, while the increase in sheet resistance reduces the signal shunting and results in higher signal amplitude. For a specific example in which the soft film material is $(Ni_{75}Fe_{25})_{0.9}Rh_{0.1}$, the magnetostriction coefficient is $+12 \times 10^{-6}$ and the sheet resistance is 38 ohms per square unit of length.

Alternatively, the soft magnetic bias layer 33 can be made of a material, such as a cobalt based material, for example, having a high magnetic anisotropy in a direction substantially normal to the ABS of the MR sensor 30. It is desirable to have the anisotropy as high as possible, and the anisotropy should be greater than 10 Oe. to produce the desired bias profile.

To produce highly negative magnetostriction films such as for longitudinal bias layer 35, a high Ni content permalloy film can be used. For example, a film of Ni90-Fe10 has a magnetostriction coefficient of about $-15 \times 10^{-6}$.

Although a square butted junction between the layers in the central region 34 and the layers in the end regions 38 is shown conceptually in FIG. 3, the preferred embodiment comprises a junction in which the topography is well controllable so that the junction can be produced easily and reliably. One suitable technique is by the production of a contiguous junction as described in commonly assigned U.S. Pat. No. 5,018,037. In this technique the MR layer, the nonmagnetic spacer layer, and the soft magnetic bias layer are deposited over the length of the sensor and a photoresist stencil is produced which defines the central region of the sensor. The end regions of the three layers are then removed by a subtractive process, and the same photoresist stencil is then used to deposit the layers in the end regions with a carefully defined junction with the layers of the central region at their edges.

Figure 4:
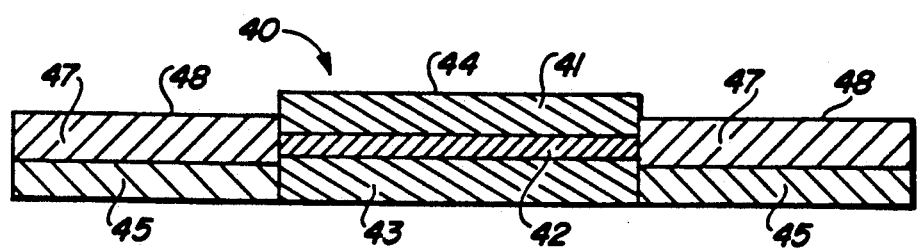
FIG. 4 is an end view of an alternate embodiment of a magnetoresistive read transducer according to the present invention.

An alternate embodiment of the MR sensor, according to the present invention, is shown in FIG. 4. The MR sensor 40 comprises an MR layer 41, a nonmagnetic spacer layer 42, and a soft magnetic bias layer 43, each of which extends over the central region 44 only. The MR sensor 40 also comprises means for producing a longitudinal bias 45, and a conductive lead structure 47, each of which extends over the end regions 48 only. In this embodiment, the means for producing a longitudinal bias 45 comprises a hard magnetic bias material such as CoPtCr, CoNiCr, CoCr or other high coercivity material.

Figure 5:
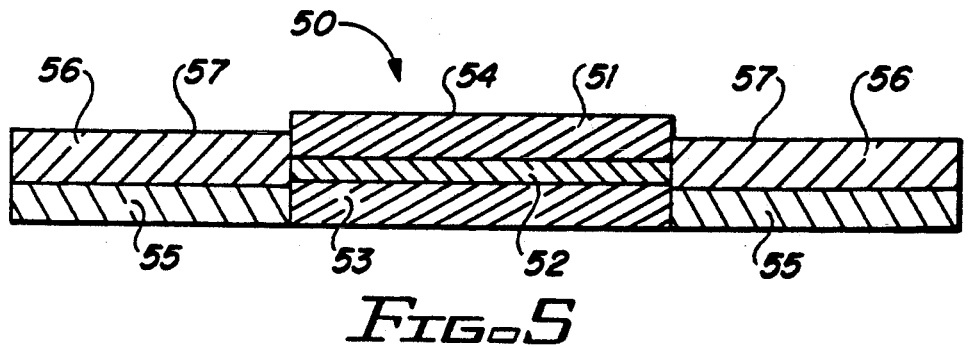
FIG. 5 is an end view of a further embodiment of a magnetoresistive read transducer according to the present invention.

A further embodiment of the MR sensor is shown in FIG. 5 in which the MR layer 51, the nonmagnetic spacer layer 52, and the soft magnetic bias layer 53 extend over the central region 54 only. The means for producing a longitudinal bias 55 and conductive lead structure 56 extend over the end regions 57 only. In this embodiment, the means for producing a longitudinal bias 55 can be either a highly negative magnetostriction NiFe layer, a highly negative magnetostriction NiFe ternary alloy layer, or a NiFe layer that is subjected to a thermal oxidation treatment to produce a negative magnetostriction material.

Figure 6:
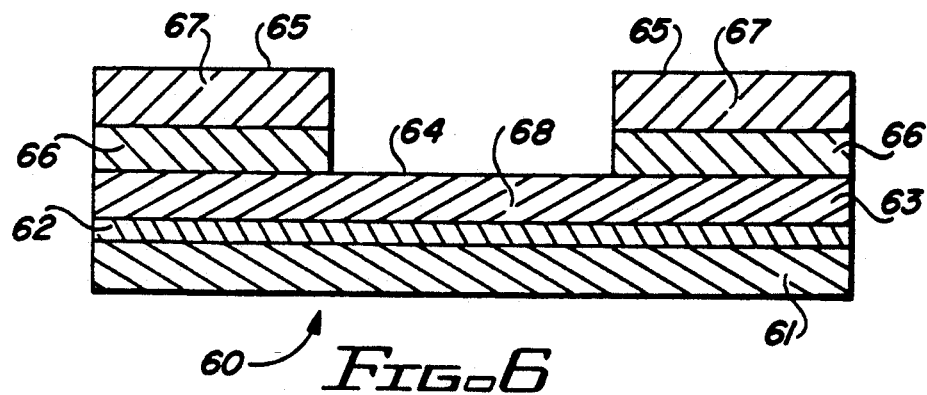
FIG. 6 is an end view of another embodiment of a magnetoresistive read transducer according to the present invention.

In the embodiment of the invention shown in FIG. 6, the MR sensor 60 comprises an MR layer 63, a nonmagnetic spacer layer 62, and a soft magnetic bias layer 61, each of which extends over both the central active region 64 and end regions 65. The MR sensor 60 also comprises means for producing a longitudinal bias 66 and a conductive lead structure 67, each of which extends over the end regions only. In this embodiment, the soft magnetic bias layer 61 may comprise either a material having a high positive magnetostriction coefficient or a material having a high intrinsic anisotropy in a direction substantially normal to the sensing edge 68.

Figure 7:
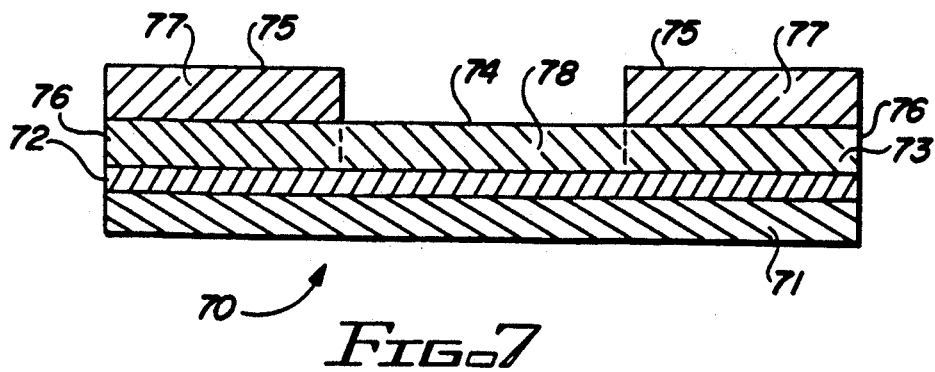
FIG. 7 is an end view of a still further embodiment of a magnetoresistive read transducer according to the present invention.

In the embodiment of the invention shown in FIG. 7, the MR sensor 70 comprises an MR layer 73, a nonmagnetic spacer layer 72, and a soft magnetic bias layer 71, each of which extends over both the central active region 74 and end regions 75. The MR sensor 70 also comprises means 76 for producing a longitudinal bias and a conductive lead structure 77, each of which extends over the end regions 75 only. The MR layer 73 has low magnetostriction in the central active region 74, however, the MR layer in the end regions has a high negative magnetostriction and the end regions are oriented to provide a longitudinal bias of a magnitude sufficient to maintain the end regions in a single domain state. The high negative magnetostriction in the end regions can be produced by subjecting the MR layer 73 in the end regions 75 only to a thermal oxidation treatment. Alternatively, the end regions can be produced with a different material such as Ni rich NiFe, for example. In this embodiment, the soft magnetic bias layer 71 may comprise either a material having a high positive magnetostriction coefficient or a material having a high intrinsic anisotropy in a direction substantially normal to the sensing edge 78.

It has been shown that the independent selection of the magnetostriction coefficient in the various parts of the MR sensor including the MR layer, the soft magnetic bias layer, and the longitudinal bias layer leads to an improved transducer stability and an enhanced bias profile.

In some cases, it is possible to achieve a workable MR sensor without a specific longitudinal bias source. One such example is an MR sensor used for a wide track magnetic tape recording system. In this case, the transverse bias is produced by a soft magnetic bias layer made from a material having either high positive magnetostriction or high intrinsic anisortopy in a direction substantially normal to the sensing edge which produces an improved bias profile for the MR sensor.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A magnetoresistive read transducer having passive end regions separated by a central active region comprising:

a magnetoresistive layer made from a material having a low uniaxial magnetic anisotropy corresponding to a high permeability, said magnetoresistive layer having a sensing edge;

a soft magnetic bias layer in said central active region, adjacent to but spaced from said magnetoresistive layer, said soft magnetic bias layer made from a material having a high uniaxial magnetic anisotropy along a direction transverse to said sensing edge; and means for producing a longitudinal bias directly in each of said end regions only, said means for producing a longitudinal bias comprising a layer made from a material having a high uniaxial magnetic anisotropy along a longitudinal direction of said magnetoresistive layer.

2. The magnetoresistive read transducer of claim 1 wherein said magnetoresistive layer extends over said central region only.

3. A magnetoresistive read transducer having passive end regions separated by a central active region comprising:

a magnetoresistive layer made from a material having a low magnetostriction coefficient;

a soft magnetic bias layer in said central active region, adjacent to but spaced from said magnetoresistive layer, said soft magnetic bias layer made from a material having a high positive magnetostriction coefficient; and means for producing a longitudinal bias directly in each of said end regions only, said means for producing a longitudinal bias comprising a layer made from a material having a high negative magnetostriction coefficient.

4. The magnetoresistive read transducer of claim 3 wherein said magnetoresistive layer extends over said central region only.

5. The magnetoresistive read transducer of claim 3 wherein said soft magnetic bias layer comprises a ternary alloy NiFeX where X is taken from the group consisting of Rh, Ti, Cr, Ir and Nb.

6. The magnetoresistive read transducer of claim 3 wherein said magnetoresistive layer has a magnetostriction coefficient of $1 \times 10^{-6}$ or less and said soft magnetic bias layer has a magnetostriction coefficient of $5 \times 10^{-6}$ or greater.

7. The magnetoresistive read transducer of claim 3 wherein said means for producing a longitudinal bias has a magnetostriction coefficient of $-15 \times 10^{-6}$ or greater.

8. The magnetoresistive read transducer of claim 3 wherein said means for producing a longitudinal bias comprises an antiferromagnetic material in contact with a ferromagnetic material to produce an exchange bias field of a level sufficient to maintain said end regions of said transducer in a single domain state.

9. The magnetoresistive read transducer of claim 3 wherein said means for producing a longitudinal bias comprises a hard magnetic layer.

10. The magnetoresistive read transducer of claim 3 wherein said means for producing a longitudinal bias comprises a layer of ferromagnetic material.

11. The magnetoresistive read transducer of claim 10 wherein said layer of ferromagnetic material is subjected to a thermal oxidation treatment.

12. A magnetoresistive read transducer having passive end regions separated by a central active region comprising:

a magnetoresistive layer made from a material having a low magnetostriction coefficient, said magnetoresistive layer having a sensing edge extending over said central active region;

a soft magnetic bias layer in said central active region, adjacent to but spaced from said magnetoresistive layer, said soft magnetic bias layer made from a material having a high magnetic anisotropy in a direction normal to said sensing edge; and means for producing a longitudinal bias directly in each of said end regions only of a level sufficient to maintain said end regions in a single domain state.

13. The magnetoresistive read transducer of claim 12 wherein said soft magnetic bias layer comprises a ternary alloy NiFeX where X is taken from the group consisting of Rh, Ti, Cr, Ir and Nb.

14. The magnetoresistive read transducer of claim 12 wherein said soft magnetic bias layer comprises a cobalt based material.

15. The magnetoresistive read transducer of claim 12 wherein said means for producing a longitudinal bias comprises an antiferromagnetic material in contact with a ferromagnetic material to produce an exchange bias field of a level sufficient to maintain said end regions of said transducer in a single domain state.

16. The magnetoresistive read transducer of claim 12 wherein said means for producing a longitudinal bias comprises a hard magnetic layer.

17. The magnetoresistive read transducer of claim 12 wherein said means for producing a longitudinal bias comprises a layer of ferromagnetic material.

18. The magnetoresistive read transducer of claim 17 wherein said layer of ferromagnetic material is subjected to a thermal oxidation treatment.

19. A magnetoresistive read transducer having passive end regions separated by a central active region comprising:

a magnetoresistive layer made from a material having a low magnetostriction coefficient, said magnetoresistive layer having a sensing edge extending over said central active region and said end regions; and a soft magnetic bias layer in said central active region, adjacent to but spaced from said magnetoresistive layer, said soft magnetic bias layer made from a material having a high magnetic anisotropy in a direction normal to said sensing edge.

* * * * *